(12) United States Patent
Morhard et al.

(10) Patent No.: US 7,277,015 B1
(45) Date of Patent: Oct. 2, 2007

(54) SYSTEM AND METHOD FOR DETECTING, MONITORING, TRACKING AND IDENTIFYING EXPLOSIVE MATERIALS

(76) Inventors: Robert C. Morhard, 5101 Brandywine Dr., Eagleville, PA (US) 19403; Thomas A. Gelormino, 233 Oakbrook Ln., Torrington, CT (US) 06790; Thomas M. Zukovich, 5220 Shawnee Blvd., Schnecksville, PA (US) 18080

( * ) Notice: Subject to any disclaimer, the term of this patent is extended or adjusted under 35 U.S.C. 154(b) by 0 days.

(21) Appl. No.: 11/621,767

(22) Filed: Jan. 10, 2007

Related U.S. Application Data (63) Continuation of application No. 11/435,909, filed on May 17, 2006, and a continuation of application No. 11/435,908, filed on May 17, 2006, and a continuation of application No. 11/435,707, filed on May 17, 2006, and a continuation of application No. 11/435,704, filed on May 17, 2006.

(60) Provisional application No. 60/761,466, filed on Jan. 24, 2006, provisional application No. 60/681,866, filed on May 17, 2005.

(51) Int. Cl.
   *G08B 13/14* (2006.01)
(52) U.S. Cl. .............. 340/572.1; 340/505; 340/539.13; 340/539.22
(58) Field of Classification Search ................ None
   See application file for complete search history.

(56) References Cited

U.S. PATENT DOCUMENTS

| | | | |
|---|---|---|---|
| 4,114,032 A | | 9/1978 | Brosow et al. |
| 4,197,104 A * | | 4/1980 | Krystyniak et al. ............ 65/1.3 |
| 4,239,261 A * | | 12/1980 | Richardson ................... 238/74 |
| 4,390,452 A * | | 6/1983 | Stevens .................... 252/408.1 |
| 5,347,274 A | | 9/1994 | Hassett |
| 6,411,208 B1 * | | 6/2002 | Buess et al. ................. 340/540 |
| 6,796,504 B2 * | | 9/2004 | Robinson .................. 23/462.13 |
| 6,810,816 B2 * | | 11/2004 | Rennard ...................... 102/430 |
| 6,919,803 B2 * | | 7/2005 | Breed ..................... 340/539.14 |
| 6,927,688 B2 * | | 8/2005 | Tice ........................ 340/539.26 |
| 6,995,673 B1 | | 2/2006 | Osredkar et al. |
| 7,002,472 B2 | | 2/2006 | Stratmoen et al. |
| 7,035,856 B1 * | | 4/2006 | Morimoto ..................... 707/10 |
| 7,088,229 B2 * | | 8/2006 | Johnson ..................... 340/505 |
| 7,100,052 B2 | | 8/2006 | Ghazarian |
| 7,120,521 B2 | | 10/2006 | Lilley |
| 2004/0124977 A1 * | | 7/2004 | Biffar ..................... 340/539.13 |
| 2005/0032226 A1 | | 2/2005 | Natan |
| 2006/0054013 A1 * | | 3/2006 | Rodney et al. ............ 89/36.02 |

* cited by examiner

*Primary Examiner*—Benjamin C. Lee
*Assistant Examiner*—Son Tang
(74) *Attorney, Agent, or Firm*—Wolf, Block, Schorr and Solis-Cohen LLP (57) ABSTRACT

This invention relates to a system and method for monitoring, detecting, tracking and identifying explosive materials. The system and method involves tracking and monitoring the explosive material during every part of the chain of custody.

14 Claims, 8 Drawing Sheets

SYSTEM AND METHOD FOR DETECTING, MONITORING, TRACKING AND IDENTIFYING EXPLOSIVE MATERIALS

This Application is a Continuation of U.S. Non-Provisional Application Ser. No. 11/435,908, filed May 17, 2006, which in turn claims benefit of priority to U.S. Provisional Application No. 60/681,866 filed May 17, 2005 and U.S. Provisional Application No. 60/761,466, filed Jan. 24, 2006; a Continuation of U.S. Non-Provisional Application Ser. No. 11/435,704, filed May 17, 2006, which in turn claims benefit of priority to U.S. Provisional Application No. 60/681,866 filed May 17, 2005 and U.S. Provisional Application No. 60/761,466 filed Jan. 24, 2006; a Continuation of U.S. Non-Provisional Application Ser. No. 11/435,909, filed May 17, 2006, which in turn claims benefit of priority to U.S. Provisional Application No. 60/761,466 filed Jan. 24, 2006; and a Continuation of U.S. Non-Provisional Application Ser. No. 11/435,707 filed May 17, 2006, the entireties of which are hereby incorporated by reference.

BACKGROUND OF THE INVENTION

1. Field of Invention

The present invention relates to the field of explosives. In particular the present invention relates to systems, methods and devices for detecting, monitoring, tracking and identifying explosive materials.

2. Description of the Related Technology

Terrorism is a real and viable threat to the security of this country and the security of the world in general. Examples of such terrorist acts include the train bombings that occurred in Madrid and the Oklahoma City bombing on Apr. 19, 1995. Preventing acts of terrorism and improving the security of the general public is of vital importance to the private sector as well as the government. One way to accomplish this goal is to facilitate a way of detecting, tracking, monitoring and identifying explosive materials, including their constituent components, prior, during and after manufacture as well as during and after distribution. There currently are no methods or systems that track in real-time or substantially-real-time all explosive materials, such as, detonators, and other similar explosive materials at various stages of the manufacturing, shipping and storage or otherwise within the "chain of custody" from start to finish. There is also an inability to provide methods for facilitating investigation of sites that have suffered from an attack using explosives.

In the past there have been methods and devices that attempt to identify where a particular explosive material originated or attempt to more easily detect and identify explosive material that can survive detonation of explosive material. For example, taggant particles have been made which can range from up to 1000 microns down to 20 microns that can be made of any of a number of substances, such as microscopic pieces of multilayered colored plastic, and can be added to an explosive to indicate its source of manufacture. The microscopic pieces of multilayered colored plastic can be formulated within or applied to explosive materials. The specific manufacturer, batch and perhaps outlet where the explosive was purchased can be identified through the colored plastic taggants and may also facilitate identification of the purchaser.

Similarly, taggants can also come in chemical form. For example, DMNB (2,3 Dimethyl 2,3 Dinitrobutane) is one such chemical taggant that is used in association with the manufacture of explosive materials. In use, chemical taggants such as DMNB as used as tagging/detecting agents for plastic bonded explosives (PBX). An explosive substance with a chemical taggant such as DMNB is more readily detected by existing explosives detection equipment known in the art. The specific manufacturer and batch can be identified through taggants and can help facilitate identification of the purchaser.

In the field of tracking, and passive RFID (Radio Frequency Identification Devices) tags are often used in connection with tracking systems for the manufacture of goods and are capable of location and identification of items in production and storage areas. In use, RFID tags are attached to the item or object to be tracked, remote sensing antennas are placed at a predetermined area to be monitored, and interrogators are connected to the sensing antennas to receive the antenna signals. Thereafter the signals may be transmitted to a network system and data base for tracking and recording.

However, none of these systems or identifying devices along solve the problems with detecting, tracking, monitoring and identifying all, or substantially all of the explosive material in a predetermined geographical location in real-time or substantially-real-time from the manufacturing stage to the receipt by an end user, and subsequent storage. Moreover, none of these systems or devices known in the art operate to control, detect, monitor and track explosive materials and similar hazardous material so they cannot be misused in improvised explosive devices or the like. Thus, there is a need for an improved system and method to detect, track, monitor and identify all or substantially all of the explosive materials, from the manufacturing stage, to the transit and handling stage, and finally to an end user.

SUMMARY OF THE INVENTION

The instant invention is an improved system and method to track and identify all or substantially all of the explosive materials, from the manufacturing stage, to the transit and handling stage, and finally to an end user.

A first aspect of the invention is a system for tracking explosive materials, comprising: an identifier for an explosive material having means for transmitting information; a transportation unit having means for transmitting information; a storage element having means for transmitting information; and a database having means for receiving information.

A second aspect of the invention is a method for tracking explosive materials, comprising: attaching a first identifier to an explosive material; placing said explosive material into a container; attaching a second identifier to said container; receiving data from said first and second identifiers at a first data reception device A third aspect of the invention is a tracking system, comprising: a first identifier adapted for use with an explosive material, wherein said first identifier is a visibility device; a visibility device reader adapted to receive data from said first identifier; and a first database adapted to receive data from said visibility device reader; wherein said visibility device is a micro-fiber, wherein said micro-fiber is incorporated within said explosive materials and said micro-fiber is less than 100 microns in diameter.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE INVENTION

The present invention relates to systems, methods and devices for detecting, tracking, monitoring and identifying in real-time or in substantially-real-time the activities, movements, locations and positions associated with explosive materials, which encompasses both the explosives and articles associated with explosives, including but not limited to oxidizing materials such as ammonium nitrate (a major raw material used in the manufacture of explosive material), blasting agents, detonators, constituent components of explosives, ordinance and ammunition, fuzes, initiation and ignition systems and any chemical compound mixture or devices, the primary or common purpose of which is to function by detonation, deflagration or explosion, and includes, but is not limited to, emulsion explosives, water gel explosives, slurry explosives, dynamite and other high explosives, propellant materials, initiating explosives, safety fuses, squibs, detonating cord, nonelectric and electric initiation systems and components, igniter cord, and igniters, in conjunction with the manufacture, handling, delivery and storage thereof. Explosive materials also include, but are not limited to, substances or articles that have been classified world-wide as hazardous materials under *United Nations International Agreements Concerning the International Carriage of Dangerous Goods by Road*, by specific tests described within the *United Nations Recommendations on the Transport of Dangerous Goods; Manual of Tests and Criteria*, industrial and military substances and articles which are grouped in general classes as "propellants," "explosives" and "pyrotechnics," as are generally known in the art, and as defined within 18 U.S.C. 40 and 27 C.F.R. 55.

The present invention comprises the use of "smart" identifiers, transportation units and storage elements in order to facilitate the detection, precise real-time or substantially-real-time tracking and confirmed identification for all or substantially all explosive materials within a predetermined geographical area. Additionally, authorized personnel that are involved in the manufacturing, shipping, and manufacturing of the materials may all be tracked so that their locations and movements may be monitored. The term "smart" is used to indicate an elements ability to either transmit and/or receive tracking information, or its ability to in some way facilitate identification, monitoring and tracking.

Preferably in the method and system of the present invention identifiers are generally included within the initial manufacturing of explosive materials. Potential "smart" identifiers generally consist of those identifiers which assist in facilitating the monitoring of, detection of, tracking of, and identification of explosive materials.

One identifier used in the instant invention consists of RFID (Radio Frequency Identification Device) tags. The RFID tags used may be, micro-RFID tags, macro RFID tags, nano-RFID tags, active tags, passive tags, and semi-passive RFID tags or other suitable RFID tags which are capable of transmitting data to a RFID integration device which can act as a transceiver and receiver. Active RFID tags are tags that contain a battery and can transmit data to a reader. Passive RFID tags are tags that do not contain a battery and cannot transmit data unless interrogated by a RFID integration device. RFID tags can be write-read or read only tags.

A RFID integration device, is needed to send a radio frequency signal to a passive RFID tag in order to interrogate it, and may also operate as a reader, which can be both a transmitter and receiver. This signal activates the tag so that it can respond to the reader with the tag information. In this way the RFID integration device operates as a data collection device by receiving data from the RFID tags. In embodiments that use active RFID tags containing a battery, an RF signal can be sent to the RFID integration device without having to first transmit an interrogation signal to the RFID. The RFID integration device operates in these scenarios simply as a receiver for collecting the transmitted data.

In one preferred embodiment, the RFID tags are small integrated circuits connected to an antenna that can respond to an interrogating RF signal with simple identifying information, or with more complex signals depending on the size of the integrated circuit, RFID tags can be placed within or applied to explosive materials but can also be affixed to the product and/or product packaging. Such use of RFID tags provides real-time or substantially-real-time tracking of explosive materials throughout the supply-chain, from manufacture, to transport, to handling, and to storage, as well as providing a mechanism that would assist in identifying people who come into contact with explosive materials.

In one embodiment of the present invention, the RFID tag can be covertly placed within a detonator or general explosive thereby prohibiting tampering of and/or possible removal of the tags without comprising explosive safety. FIGS. 1a-1e show various embodiments of an explosive material that has various identifiers attached thereto. Detonators 24 may be electric, non-electric, or electronic. FIGS. 1b-1e show the usage of RFID 12a either attached to the detonator body 21, or attached to wiring 29. The usage of RFID 12a in these specific embodiments help to prevent the possibility of tampering by detecting movement of the explosive materials. RFID 12a is typically serialized so that the each detonator 24 to which RFID tag 12a is attached can be individually identified.

The RFID tags and the related local transmitters and receivers may operate on battery, line, solar generated power or other suitable energy sources. The RFID integration device preferably utilizes encrypted data transfer software and hardware, such as, for example, GPS and Internet, to continuously report real-time or substantially-real-time "chain-of-custoday" information to government, private entities, and/or authorized personnel. However, other methods of suitable data transfer known in the data are also contemplated within the scope of the present invention.

In using RFID tags and RFID integrated devices with explosive material it is important that the devices operate within a certain power range in order to ensure that the explosive material remains stable and/or is not triggered. In order to accomplish this the RFID tags and RFID integrated devices are designed to operate with very minimal RF energy, typically less than 0.004 Watts. This level of power ensures that explosives will not detonate due to the operation of the RFID devices.

Another identifier that may be used is visibility device 23 shown attached to detonator body 21 and proximate to scaling plug 27 in FIGS. 1a-1e. Visibility device 23 includes but is not limited to the addition of a component such as a micro-fiber to the explosive material. A micro-wire consists of a chipless, glass-coated fiber with an amorphous alloy core that is smaller than a human hair. Micro-wire may have a diameter that is less than 100 microns, in preferred embodiments the micro-wire is less than 50 microns. In this embodiment, the insertion or application of visibility device 23 serves to assist in the detection of explosive material by providing visibility characteristics to the explosives materials so as to further assist in identifying the presence of explosive material. When deployed, visibility device 23 can be incorporated or included within explosives packaging materials, within the explosives formulation, raw materials, and/or included within component articles for the purpose of providing detection or visibility by electronic scanning devices or visibility device readers strategically located in areas where improvised explosives device (IED) or bombs may be used for terrorist acts near transportation services or other public gathering points. This enables the ability to quickly respond to such situations as well as to provide the means for ascertaining where the explosive materials had come from.

The usage of visibility device 23 provides an additional layer of detection ability. It is possible to read multi-bit information from a micro-wire segment that is less than 40 microns in diameter from a distance of up to 25 meters. A micro-wire is preferably less than 100 microns in diameter. The micro-wire's small size permits it to be covertly incorporated inside of explosive material or attached to the outside of explosive material with a simple label. Furthermore, a micro-wire is functional in the presence of metals, foils, and liquids. Temperatures up to 400 degrees F° or below freezing do not affect a micro-wire. Each micro-wire may be assigned its own magnetically embedded code, making it possible to securely identify, track and trace individual items. When using visibility device 23 in conjunction with a RFID device, both may have the same coding so as to provide additional means for identification. It is contemplated that visibility device readers may be used in conjunction with RFID integration devices, as well as being located in areas that may be subjected to IEDs. For example, a visibility device reader may be located at the manufacturer, storage facility, transportation unit, and distribution site. Additionally, visibility readers may be placed on high volume public transportation devices that may be subject to attacks using IEDs.

Another identifier may consist of covert markings, which includes but is not limited to cold laser imprints, holograms, nano-markings and other imprints which provide additional identification mechanisms. Nano-markings are minute markings, such as serial-numbers, in the scale of nanometers or microns. FIGS. 1a-1e and 2 illustrate the location of ID marks 25 on detonators 24. ID mark 25 may be nano-mark that has identifying information composed of alphanumeric characters, or a graphical image that may be used to identify manufacturer, type of explosive and other salient information related to the explosive material.

In a preferred embodiment of the system, the Identifying information of the RFID tag on a detonator is converted into a numerical, alphanumerical mark or graphical image and is used to form ID mark 25. ID mark 25 is applied to or included within a metal detonator shell as a covert or clandestine mark that can be forensically examined in a post blast bomb scene by law enforcement or bomb scene investigators for the purpose of recreating the chain-of-custody, and correlating the ID mark 25 to people and location data stored in a database in order to facilitate real time bomb scene investigation. ID mark 25 may be included in multiple locations upon or within detonator 24. At a bomb scene or any other area where the ID mark conveying the true identity of the detonator needs to be known, the mark can be examined by a microscope eliciting the numerical, alpha numerical mark or graphic image.

A nano-mark is produced by nano-engineering techniques using inscription, etching or lithography with focused light, focused laser energy or focused ion beam energy. An example of a nano-mark is A649ZPT784 shown in FIG. 2. The size of the mark is preferably between 20 microns in height and 75 microns in length to 50 microns in height and 125 microns in length, however the mark may be between 5 microns in height and 35 microns in length and 100 microns in height and 250 microns in length. During or after application of ID mark 25, an infrared or ultraviolet clear dye is applied to the metal detonator shell for facilitating its visibility using special optics and light conditions by forensic bomb scene investigators to identify fragments or metal detonator shell pieces at the bomb scene. After reading ID mark 25, investigators may access a database to identify the pedigree of detonator 24 in an expedient fashion in order to facilitate law enforcement. This identification of ID mark 25 may be performed on site at a bomb scene, or after seizure of illicit explosive material, and therefore be capable of providing near instantaneous identification of the chain of custody.

In preferred embodiments of the present system and method, as many of the identifiers as possible are used in order to provide multiple layers of security and tracking ability. It is additionally contemplated that the identifiers discussed in detail above can also be used with pre-existing identifiers already used with explosive materials. However, the use of only one or combination of a few of the identifiers is also within the scope of the present invention.

Transportation for use in the system and method includes, but is not limited to, trucks, boats, shipping containers, ships, railroad cars, aircraft and all other forms of transportation. The transportation units used in the present invention have hardware and software infrastructure with the capability to monitor, transmit and receive information from the identifiers used with the explosive materials. The "smart"

transportation units utilize an antenna to respond to interrogating RF signals from the tags. In one embodiment of the present invention, the transportation units are capable of actively communicating tracking and identifying information with responsible parties regarding on-board security, driver duress, and route progress. Material Safety Data Sheet (MSDS) information and other data related to the status of the explosive materials, as well as the transportation unit itself. The transportation units are capable of communicating and transmitting tracking and identifying information through related local transmitters and receivers by means of encrypted data transfer software and hardware (GPS and Internet) in order to continuously report real-time "chain-of-custody" information to designated parties. However, other methods of suitable data transfer and data interpretation known in the art are also contemplated within the scope of the present invention.

Figure 1A:
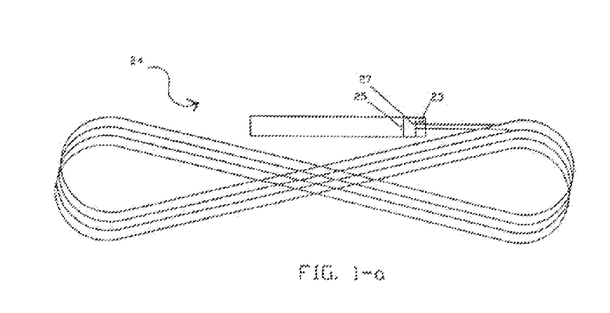
FIG. 1a is a diagram of a detonator having a visibility device and an ID mark.
Figure 1B:
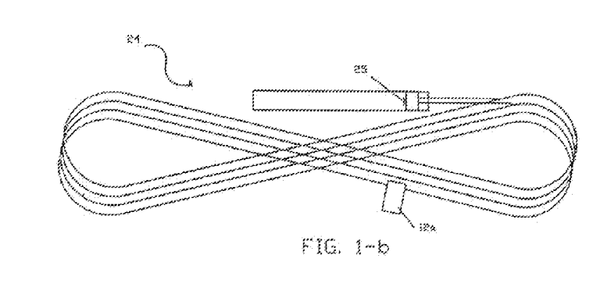
FIG. 1b is a diagram of detonator with a RFID tag on a located on a flag-tag and an ID mark.
Figure 1C:
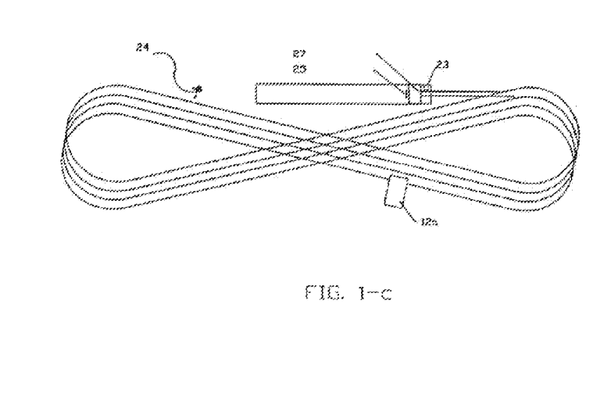
FIG. 1c is a diagram of a detonator having a visibility device and a RFID tag located on a flag tag, and an ID mark.
Figure 1D:
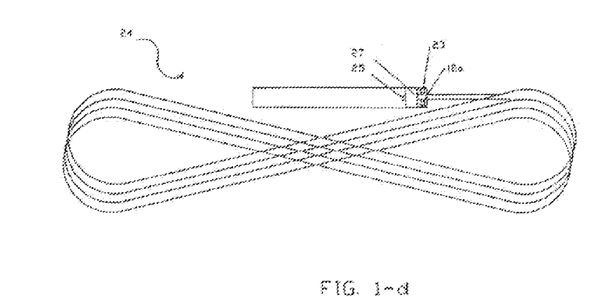
FIG. 1d is a diagram of a detonator with a visibility device, a RFID tag attached to a detonator's sealing plug, and an ID mark.
Figure 1E:
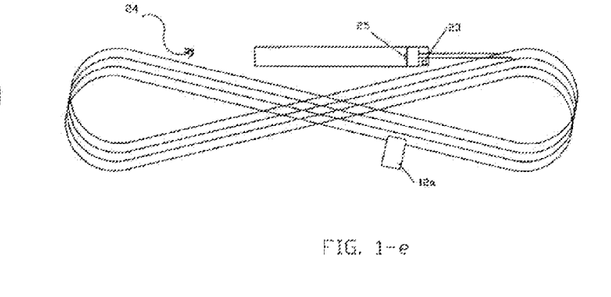
FIG. 1e is a diagram showing a detonator with a RFID tag contained within a detonator's sealing plug.
Figure 2:
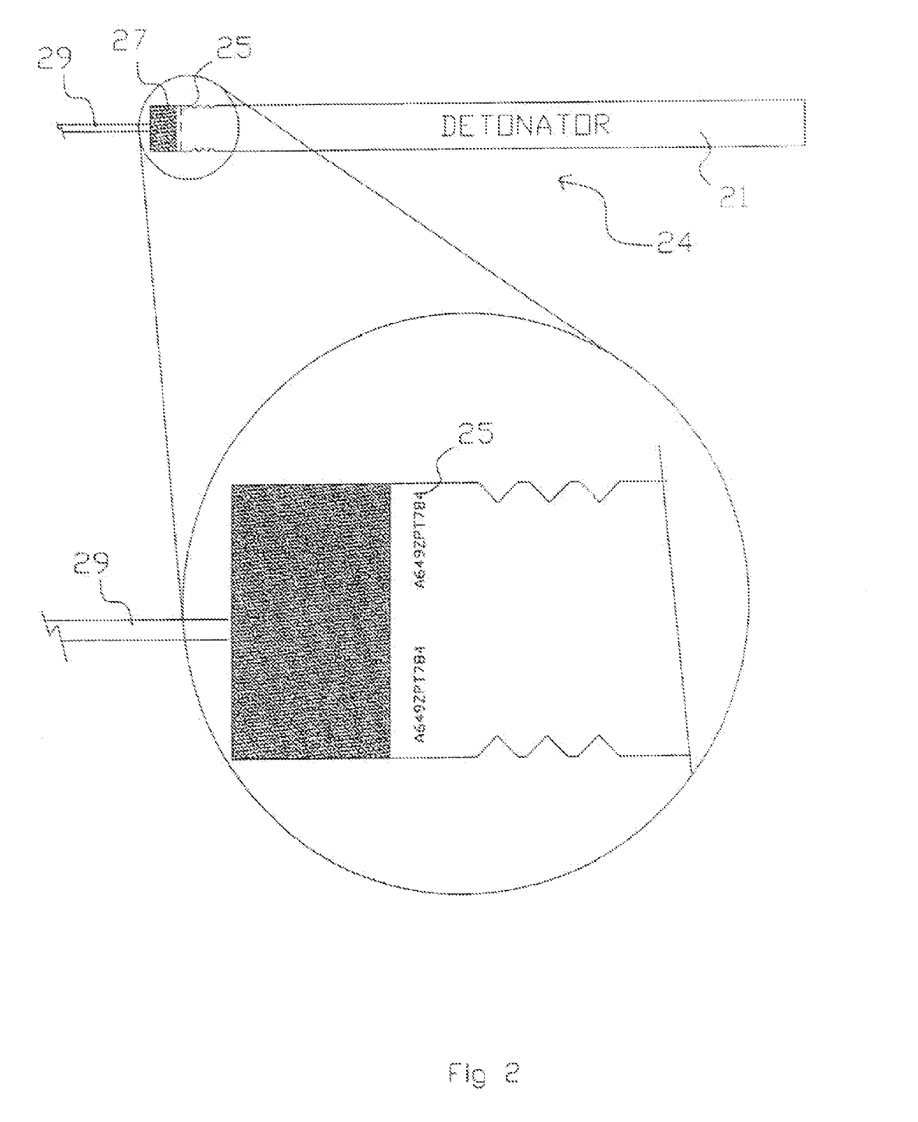
FIG. 2 is a diagram of an explosive material illustrating the position of an ID mark.
Figure 3:
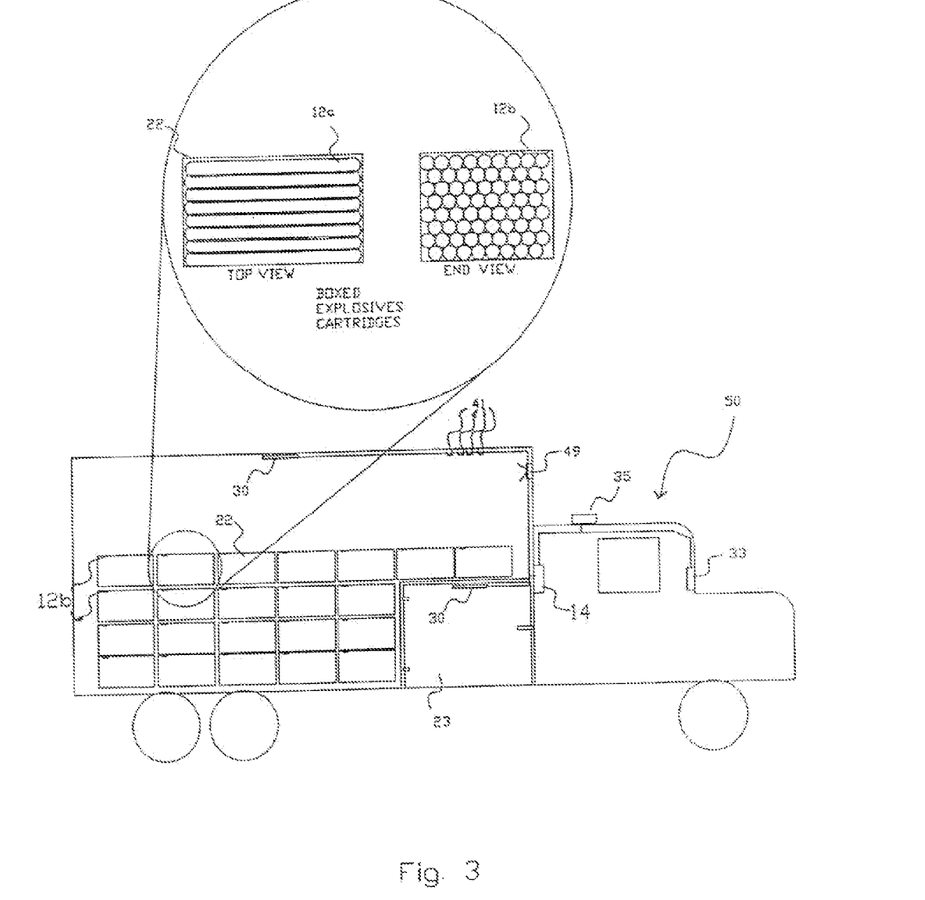
FIG. 3 is a diagram illustrating the components of a smart transportation unit.

FIG. 3 shows a diagram of a transportation unit that may be used in the system and method of the instant invention. Transportation unit 50, as shown, is a truck enabled to transport explosive materials. Transportation unit 50 contains a number of containers 22 that each have RFID tags 12b contained within or attached thereto. The shown transportation unit has a separate detonator container 23 that also utilizes RFID tags and has its own antenna 30. In the preferred embodiment, each of the explosive materials has RFID tags 12a contained within or attached thereto. Within the body of transportation unit 50 one or more RFID antennas 30 are attached that are operably connected to RFID integration device 14. Through usage of antennas 30 the various RFID tags may be interrogated at various intervals in order to insure that all materials are accounted for, or alternatively the RFID tags may be programmed to transmit their presence at specific intervals.

Also provided within the body of transportation unit 50 may be a series of sensors 41. Sensors 41 may be used to detect and measure a variety of physical properties of the interior of transportation unit 50. Such properties may be light, temperature, motion, sound, and humidity. Through the usage of sensors 41, an additional layer of monitoring is provided so that it can be determined at an early stage whether or not the safety or security of the explosive materials has been compromised. It is also contemplated that one or more closed circuit television (CCTV) cameras 49 are also mounted within transportation unit 50 in order to provide a visual display of the interior. Images received from cameras 40 and sensors 41 may be relayed through RFID integration device 14 and also to driver interface 33. The data provided can then be monitored and analyzed both locally and non-locally in order to fully ascertain the integrity of vehicle 50.

Transportation unit 50 further has GPS device 35, which may be a T2 tracker, BT 2010 unit, or some similar device. GPS device 35 is able to relay information related to the location of transportation unit 50. This information is then able to be used by non-local personnel to detect potential trouble spots that may occur during the transportation of the materials. Such trouble spots may be areas that have heavy population, or have become congested due to a non-planned for event, such as a traffic accident. When such a scenario should arise operators of the transportation units may be informed that a change in route is needed. It will also be possible to determine if transportation unit 50 has inexplicably veered from a prearranged route, such as may occur due to a hijacking. Transportation unit 50 may also include within driver interface 33 antitheft devices, such as auto shut down devices that may be triggered by non-local personnel in the event that it appears that the transport of explosive materials has been comprised.

In the present invention, "smart" storage elements, such as magazines, have hardware and software infrastructure with the capability to monitor, and read information from identifiers. The storage elements accept explosive materials cargo containing identifiers delivered by transport units, and further communicate tracking and identifying information through related local transmitters and receivers by means of encrypted data transfer software and hardware, such as GPS and Internet, to continuously report real-time "chain-of-custody" information to responsible parties. Other methods of suitable data transfer known in the art are also contemplated within the scope of the present invention.

At the end of the supply-chain, the storage elements may process the final disposition of explosive materials having identifiers and the final delivery via transport units to the legal end-user. Databases may correlate the list of explosives licensees (or people data) with the identifiers thereby completing the "chain-of-custody."

Figures 4A, 4B:
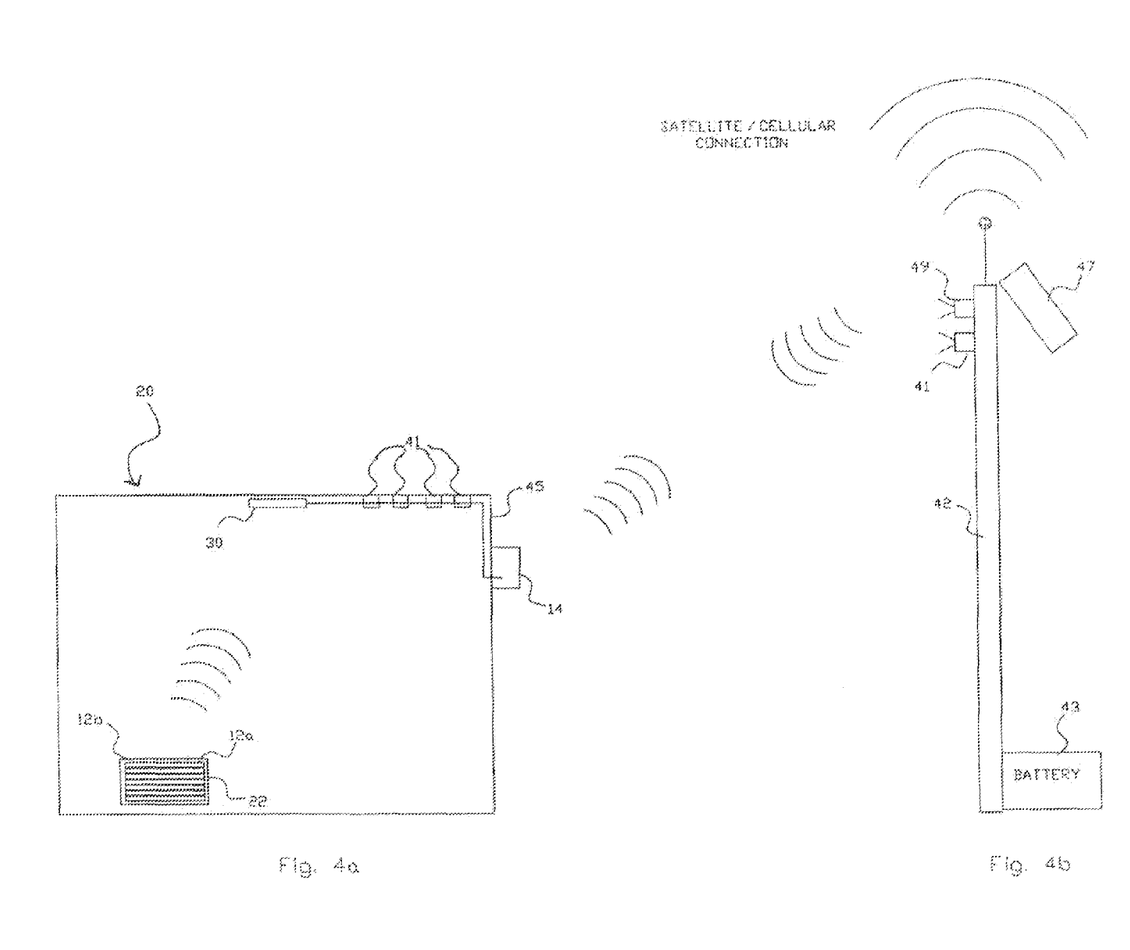
FIG. 4a is a diagram illustrating a smart storage unit.
FIG. 4b is a diagram illustrating an area surveillance unit.

FIG. 4a illustrates a "smart" storage unit. Magazine 20 is used for storing explosive material. FIG. 4a shows container 22 placed within magazine 20. Container 22 has RFID tag 12b attached thereto. Each of the explosive materials placed within container 22 has an RFID tag 12a attached thereto. Access to magazine 20 can be controlled by a combination of biometric information, PIN pad and RFID enabled identification cards to record the people that have access to magazine 20 and to provide an additional layer of security in addition to standard locks. Furthermore, antenna 30 may transmit at certain intervals a signal to RFID tag 12b to interrogate container 22 and to RFID tag 12a to interrogate the explosive materials. Sensors 41 are also provided that perform the same function in magazine 20 as they did in transportation unit 50 discussed above. Sensors 41 may detect light, temperature, motion, and noise, in addition to other physical properties as needed that may indicate that the integrity of magazine 20 has been comprised. Antenna 30 and sensors 41 are operably connected to RFID integration device 14. RFID integration device 14, sensors 41, antenna 30, plus those systems designed to prevent unauthorized access to the explosive materials act collectively as access and monitoring unit 45.

Area surveillance unit 42, shown in FIG. 4b, may be used in conjunction with magazine 20 and may be one of many area surveillance units 42 that are operating at the storage facility. In the event that there are multiple magazines 20, it is preferable that there are multiple area surveillance units 42. Area surveillance unit 42 may be operated via battery 43, or any other suitable energy source, such as solar panel 47. It is also possible, such as in the embodiment shown, that solar panel 47 and battery 43 are both provided so as to ensure that area surveillance unit is always energized. Sensors 41 are provided as well as CCTV camera 49 so as to further monitor magazine 20. Area surveillance unit 42 is also capable of transmitting information related to the status of the magazine to a database or monitoring station so that necessary steps may be taken if the security of the explosive material is in jeopardy.

Using the above "smart" identifiers, transportation units, and storage units, the activities, movements, locations and positions associated with explosive materials are capable of being transmitted through digital signals via a suitable wireless telecommunications device or other suitable devices to a satellite, general packet radio service, the Internet, intranet or extranet. Such transmission signals are capable of being relayed or downloaded to at least one database at a control center for analysis, recording or retransmission thereof. Transmission of these digital signals may occur continuously or may be activated by a predetermined event. Transmission of these digital signals may be accomplished in any of a variety of ways suitable to accomplish the goals of the present invention. The present invention contemplates use of passive and active RFID tags, visibility devices, and id marks capable of providing real-time location and identification of all explosive materials in production and storage areas. Such devices also permit real-time interrogation of trucks, boats, cars, airplanes, containers or any storage area capable of housing explosive materials to determine the exact whereabouts of an explosive material via interrogation while performing logistics, during storage and at predetermined checkpoints (e.g., at airports, in buildings, on highways, etc.). It is also possible to use GPS Geo-Fencing instead of hard receivers in order provide notification when explosive materials are moving into a restricted area.

After receiving transmissions and analyzing the activities in real-time or substantially-real-time, of the movements, locations and positions of the explosive materials, the containers and the transportation units, preventive or remedial action may be taken in the even that it appears that one part of the chain of custody appears to have been compromised.

Therefore, the present invention provides a system, devices and method of tracking explosive material that affords an early warning of any and all activities that suggest that a situation is out of the ordinary or that a situation has indeed occur. This warning occurs in real-time or substantially-real-time. If there are any peculiar activities occurring during normal manufacturing, handling, delivery or storage of explosive materials, the system and method taught by the present invention is capable of presenting such information in order to facilitate an immediate response by the proper authorities or authorized personnel. The method and system are illustrated below by way of an exemplary application of the method and system.

Figure 5:
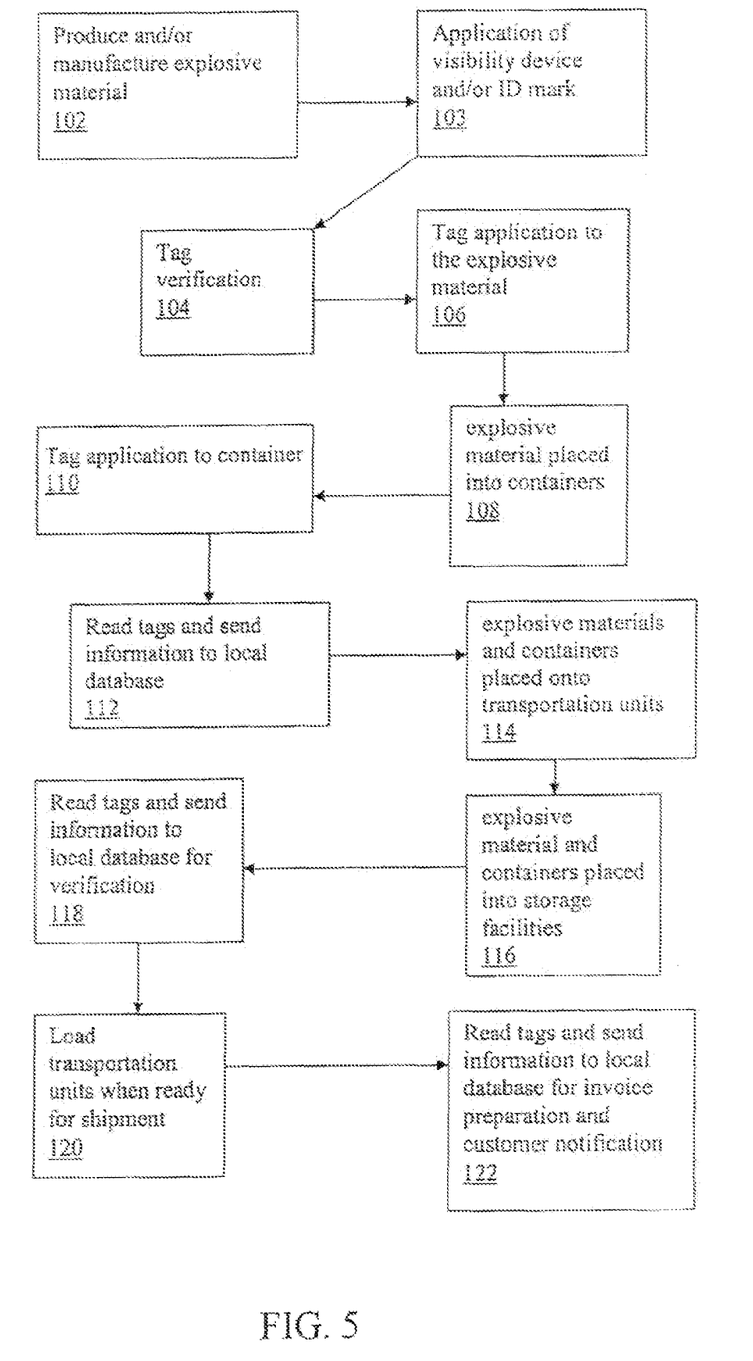
FIG. 5 shows a chart depicting the flow of information within the system during the manufacturing process.
Figure 8:
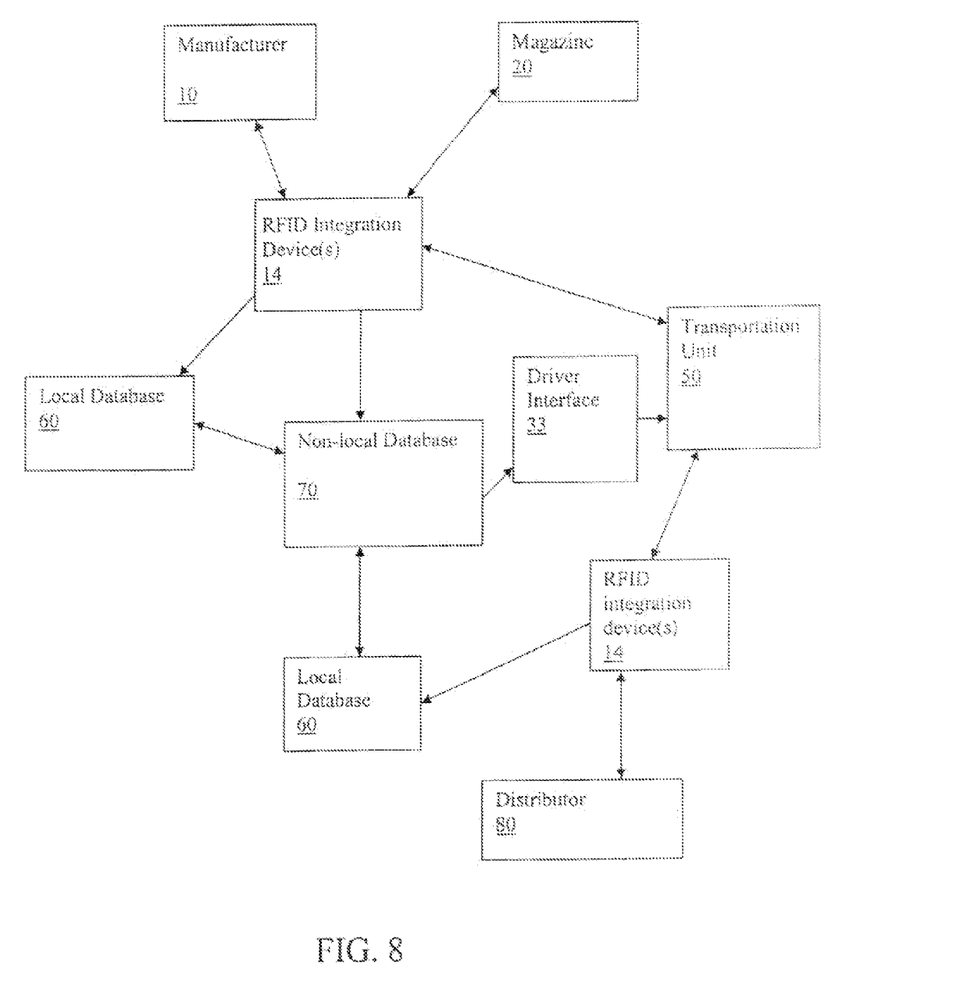
FIG. 8 is a diagram illustrating the flow of information within the system.

FIG. 5 shows the steps used in manufacturing the materials and preparing them for transport. FIG. 8 shows a flow chart depicting the system and the flow of information within the system when using the identifiers, discussed above, with explosive material.

At step 102, the explosive materials, such as packaged or cartridged explosives, including emulsion explosives, water get explosives, dynamite, cast explosives, detonators, initiation systems, explosive devices, ordinance and those explosive materials listed elsewhere in this disclosure, are manufactured. When the explosive materials are manufactured the various identifiers discussed above may be used in order to provide sufficient ability to track and identify the explosive materials.

At step 103, the application of an ID mark 25 and/or a visibility device 23 is applied to the explosive material. ID mark 25 is preferably a nano-mark or some other covert mark that is not readily visible by the naked eye. Visibility device 23 is preferably a micro-wire.

Manufacturer 10, as shown in FIG. 8, is the location where explosive materials are created. At the manufacturing site certain hardware is present for use in the system and method. RFID tag applicators are present in order to provide RFID tags 12a for the individual explosive materials at each production line. RFID tag applicators are also provided ro containers 22 at each packaging station. RFID integration devices 14 are provided at each manufacturing building, each storage facility and each vehicle that transports, stores or handles the explosive material. Magazine access controls are also provided for use with RFID enabled identification cards and other security measures such as bio-id in order to limit and track access to the manufacturing site. Local database 60 is provided in order to store the inventory information. Additionally, manufacturer 10 should also have a device for attaching a visibility device 23 to an explosive material and a device for attaching a nano-mark 25.

At step 104, an identifier, RFID tags, which may be either active, semi-active or passive, are prepared and verified. Verification takes place by entering the respective RFID tag information into a database and verifying that the RFID tags are functional and present. This information is noted and is preferably kept within local database 60, which may in turn ultimately transmit a manifest to non-local database 70.

At step 106, RFID tags 12a are attached to the explosive material. Alternatively, verification may have occurred before the actual manufacturing of the explosive material and RFID tags 12a may be included within the individual explosives materials and verification may occur shortly after placement within or attachment to the explosive material. An example of tagged explosive material is shown in FIGS. 1a-1e and 2, and is discussed in detail above.

At step 108, the tagged explosive materials are then placed into inner or outer shipping containers 22, such as boxes, crates, etc. At step 110, in the preferred embodiment, shipping containers 22 are also provided with RFID tags 12b.

At step 112, tagged containers 22 will pass through an area that contains an RFID integration device 14. RFID integration device 14 will interrogate RFIDs tags 12a-12b and the data will be sent to either local database 60 or to non-local database 70, which may be functioning as a data center for coordinating all information related to the chain of custody.

Figure 6:
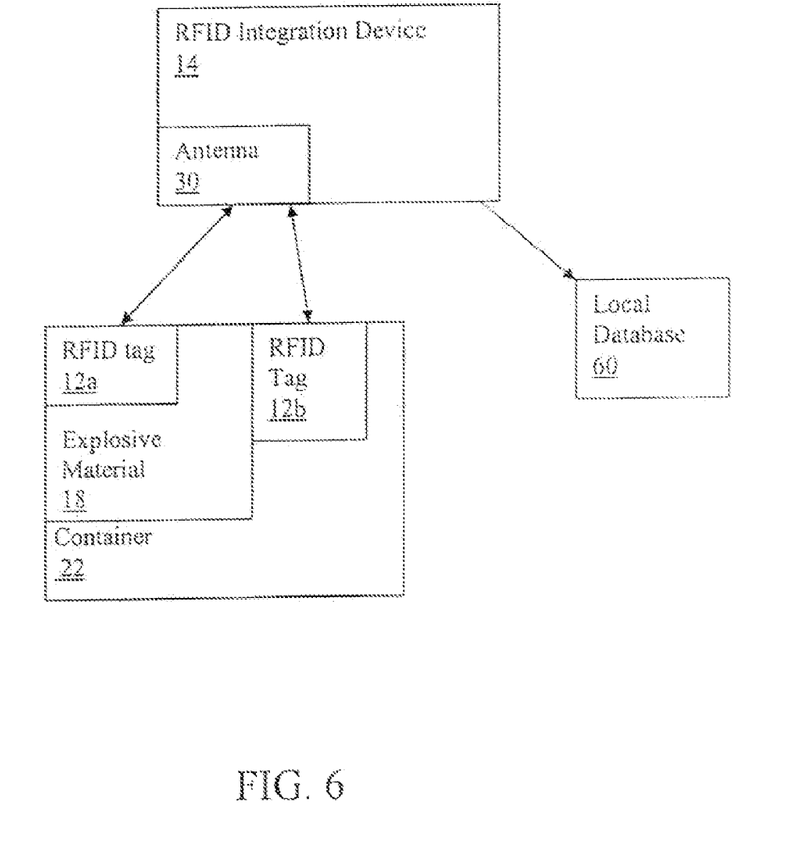
FIG. 6 is a diagram illustrating the operation of a RFID integration device.

FIG. 6 is a block diagram that illustrates this step in more detail. In the embodiment shown in FIG. 6, RFID integration device 14 transmits a signal towards container 22 via antenna 30, i.e. it interrogates container 22. RFID 12a is a passive RFID tag and is attached to an explosive material, RFID 12b is also a passive RFID tag and is attached to container 22. When RFID integration device 14 transmits the signal, RFID 12a and RFID 12b receive a signal and transmit back to RFID integration device 14 signals that convey specific identification information. It should be noted that there may be any number of RFIDs 12a inside container 22. This information is then transmitted from RFID integration device 14 to local database 60, which may act as a central database that is located on site, or the data may be sent to a database located elsewhere such as non-local database 70 that can then act as a central database.

At step 114, containers 22 are placed upon trucks or some other type of transport unit, such as those mentioned above. Containers 22 are then shipped to magazine 20 which will house the explosive material on site. At step 116, containers 22 are placed within magazine 20. At step 118, an RFID integration device 14 located at magazine 20 will transmit a signal and verify the number and location of the explosive materials. This information may then be transmitted via antennas 30, or cables, to local database 60 or non-local database 70. Access to magazine 20 can be controlled by a combination of biometric information, PIN pad and RFID enabled identification cards to record the people that have access to magazine 20 and to provide an additional layer of security in addition to standard locks. Furthermore, antenna 30 may transmit at certain intervals a signal to interrogate containers 22 and explosive materials. Additional measures may be taken in order to insure the integrity of magazine 20, such as detection of light levels, motion, noise and temperature fluctuations via the usage of sensors 41, discussed above.

At step 120, transportation units 50, such as a truck in the instant example and shown in FIG. 3, will be loaded with containers 22. Transportation unit 50 contains an RFID integration device 14 and a GPS device 35, such as a T2 tracker, BT2010, or similar device. Also part of transportation unit 50 may be a driver interface 33 that may have antitheft devices, such as auto shut down devices. Transportation unit 50 may also have its own RFID devices in order to transmit their location to other RFID integration devices.

At step 122, magazine 20 will record the removal of containers 22. Placement upon a transport vehicle will be recorded and the information will be transmitted to local database 60. The information may also be transferred to non-local database 70 from RFID integration device 14 via cellular or GPS or GPRS communications, or it may transferred from local database 60 to non-local database 70 via the Internet, or some other means for communication. Non-local database 70, or local database 60, can be instructed to adjust the inventory in magazine 20 to reflect the removal of explosive material. The databases can also be prompted to prepare and invoice for the customer and notify the customer that transportation unit 50 is leaving magazine 20, as well as to integrate with accounting and supply-chain management software systems for administrative purposes and to further log tracking and identifying information for later use, such as the nano-mark, micro-wire and RFID information.

Figure 7:
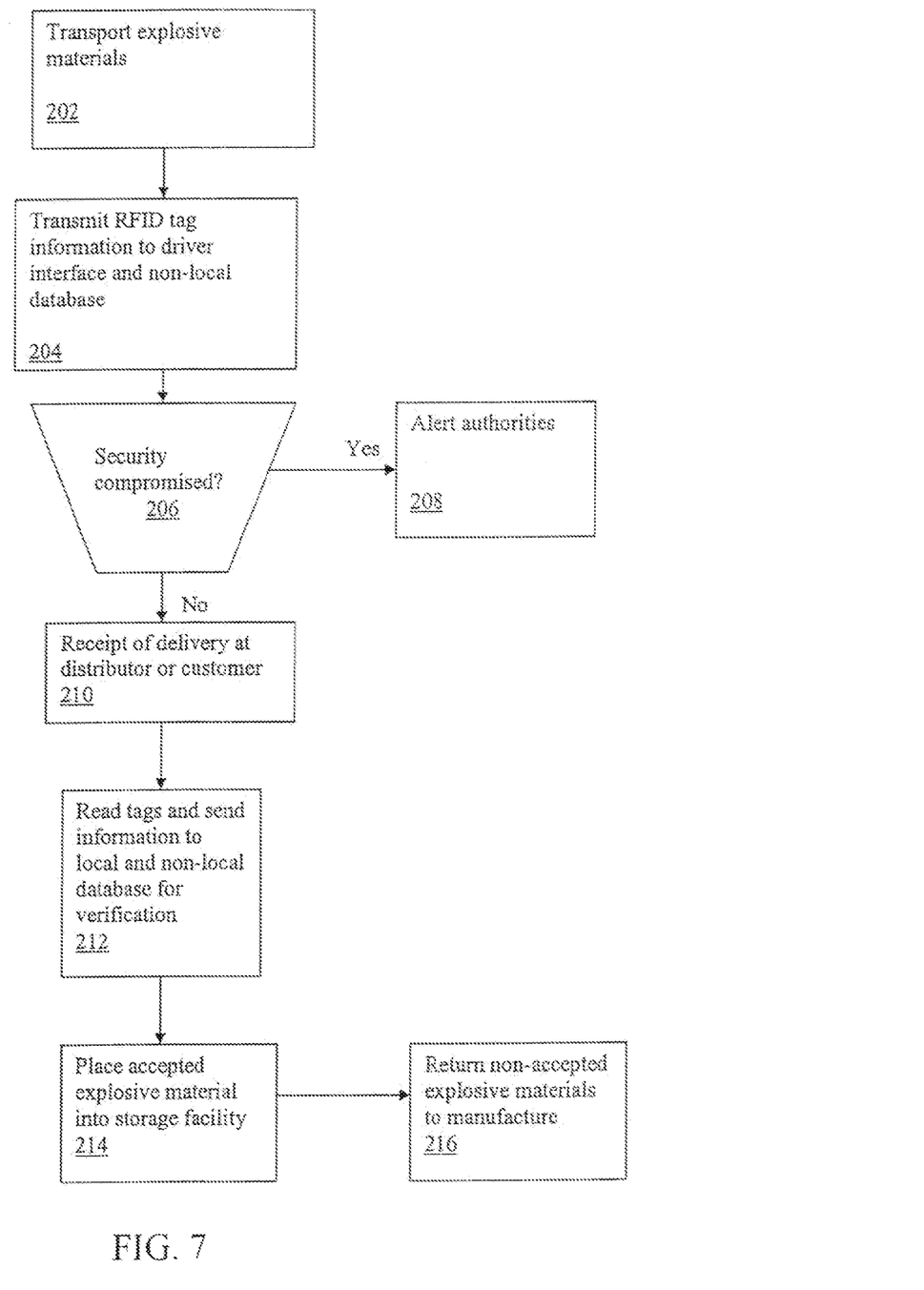
FIG. 7 shows a flow chart showing the method for tracking explosive materials during transportation and delivery.

FIG. 7 shows a flow chart illustrating the steps taken after a vehicle has been loaded with explosive materials and is shipping them to distributor 80. At step 202 the explosive materials begin to be transported, having left the site of manufacturer 10. At step 204, RFID tag 12a-12b information may be transmitted to driver interface 33 and to non-local database 70. In one embodiment, RFID integration device 14 periodically interrogates RFID tags 12a-12b.

At step 206 it is determined whether or not the security of the shipment has been compromised. If is has, at step 208, the necessary authorities may be notified. If not, at step 210, distributor 80, or a customer, receives the shipment. The parameters for ascertaining whether or not security has been compromised, or placed in jeopardy, can be pre-determined by whatever criteria is deemed pertinent. For example, if the transportation vehicle were to veer from a predetermined route or go missing, or if the containers on-board were to go missing, notification could be sent to the necessary authorities.

In monitoring the security of the explosive materials during transportation, RFID integration device 14 may act as a mobile RFID interrogation platform during transportation of the explosive materials. It may act as a control center on board the vehicle or at any site where tags are to be identified. RFID integration device 14 monitors the location of vehicle 50 by interfacing with a GPS device 35. RFID integration device 14 also monitors the current inventory of the vehicle via RFID. Other information may be tracked and transmitted as well depending on which factors are deemed important to monitor. The data, including the location and RFID tag data, is then sent to the non-local database 70 via cellular modem, GPS or GPRS. This data may also be logged locally on driver interface 33 to enable future auditing and also permits the data to be maintained if the vehicle travels through an area without cellular coverage. RFID integration device 14 can then transmit the stored data when the vehicle enters an area with cellular coverage. RFID integration device 14 can be leveraged to add additional functionality if needed since RFID integration device 14 can maintain a pluggable software architecture. Data readers (a software component) to retrieve GPS data and new publishers (a software component) to publish the data to non-local database 70 via the cellular modem may also be used. RFID integration device 14 may also include software components to monitor the data integrity and system health.

As part of the transportation of the explosive materials, distributor 80 may be notified that his or her order for explosives materials is leaving manufacturer's magazine 20. Distributor 80 is given the ID number of vehicle 50 so that the shipment may be tracked. The distributor can log on to non-local database 70 to view the location of transportation unit 50 and the contents. It is also contemplated that a third party organization may also use non-local database 70 in order to monitor substantially all transportation of explosive material, or monitor the transportation of explosive materials through highly populated areas. Manufacturer 10, distributor 80 and any authorized parties such as local law enforcement and government agencies can receive distress alerts from non-local database 70.

At step 212, after receipt of delivery occurs at step 210, RFID tags 12a-12b are interrogated, and the information is transmitted to the distributor's local database 60 and non-local database 70. AT step 214, accepted explosive material is accepted into the storage facility. The storage facility of distributor 80 should have the same security measures used by manufacture 10. Distributor 80 verifies the explosives going into his storage facility with his own RFID integration devices 14 that will send the inventory information via cellular, GPS or GPRS to the distributors local database 60. Manufacture 10, and other interested parties may be notified via non-local database 70 that the explosive materials have arrived safely at the intended location. Distributor 80 will use the same procedure of loading the trucks that are equipped with RFID integration device 14 and GPS unit 33 as used by manufacturer 10 above. RFID integration device 14 will send the magazine and transportation unit inventory information to those databases requested. At step 216, if any explosives materials are returned from the delivery they will be accounted for by interrogating the tags of those containers and explosive materials by RFID integration device 14 that will then transfer the information to the respective databases, which in turn will provide notification of the returned explosive material. The distributor's storage facility inventory will then be automatically adjusted to allow for the returned explosives.

Distributor 80 should have substantially the same system elements as the manufacturing site. Distributor 80 should have RFID integration devices 14 that are functioning as readers and are located at each building, magazine and transportation unit that handles, houses, or deals with the explosive materials. Distributor 80 site should also have a local database 60 to store the inventory information and to also act as back-up information. RFID identification cards and access controls should also be employed in order to restrict access to the explosive materials.

Non-local database 70 is the database that stores the truck locations and inventory information. Non-local database 70 also generates alerts based on exception conditions that are defined, such as a driver distress alert. Non-local database 70 is also the user interface through which users can inspect data about trucks, inventory, alerts, and history. RFID integration device 14 is responsible for collecting the location and RFID tag data and publishing it to the non-local database 70. The GPS device 35 may be BT2010, which is a combination of GPS, GPRS and a Cellular Modem. The RFID integration device 14 will interface with the GPS, GPRS, or cellular component of GPS device 35 to retrieve GPS data and use the cellular modem, GPS or GPRS component to transmit the location and RFID tag data to non-local database 70.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for tracking explosive materials, comprising:
   a first radio frequency identification (RFID) identifier attached to a container of an explosive material;
   a transportation unit for transporting said explosive material and having means for transmitting information;
   a storage element having means for transmitting information;
   a second identifier incorporated within said explosive material, wherein said second identifier is a visibility device, in form of a micro-fiber less than 100 microns in diameter;
   a plurality of data receiving devices located at predetermined locations on said transportation unit and adapted for receiving information from said first identifier, said second identifier, said transportation unit and said storage element; and
   a database having means for receiving information from said plurality of data receiving devices for tracking said explosive material.

2. The system of claim 1, further comprising a plurality of sensors located at said storage element.

3. The system of claim 2, wherein said plurality of sensors are adapted to measure physical properties selected from the group consisting of light, temperature, motion, sound, and humidity.

4. The system of claim 1, wherein said plurality of data receiving devices periodically transmit a signal.

5. The system of claim 4, wherein said signal is transmitted at a power less than 0.004 watts.

6. The system of claim 1, further comprising means for analyzing said received information to determine security status of said explosive material.

7. The system of claim 1, wherein said transportation unit further comprises means to remotely deactivated the transportation unit.

8. A method for tracking explosive materials, comprising:
   incorporating a first identifier within an explosive material, wherein said first identifier is a visibility micro-fiber less than 100 microns in diameter;
   placing said explosive material into a container;
   attaching a second radio frequency identification (RFID) identifier to said container;
   receiving data from said first and second identifiers with a plurality data reception devices and tracking said explosive material using said received data.

9. The method of claim 8, further comprising interrogating said second identifier with first data reception device.

10. The method of claim 9, further comprising placing said container on a transportation unit and interrogating said second identifier with a second data reception device located on said transportation unit.

11. The method of claim 10, further comprising transmitting to a non-local database from said transportation unit the location of said transportation unit using a GPS system.

12. The method of claim 11, further comprising transmitting an alarm if said transportation unit deviates from a pre-determined route.

13. A tracking system, comprising:
   a first identifier adapted for use with an explosive material, wherein said first identifier is a visibility device in the form of a micro-fiber incorporated within said explosive material and is less than 100 microns in diameter;
   a RFID identifier attached to a container that stores said explosive material;
   a visibility device reader adapted to receive data from said first identifier;
   an RFID interrogator to received data from said RFID identifier; and
   a database adapted to receive data from said reader and said interrogator to track said explosive material.

14. The tracking system of claim 13, further comprising a third identifier attached to an explosive device associated with said explosive material, wherein said third identifier is a nano-mark.

* * * * *